US005905857A

United States Patent [19]
Buzby et al.

[11] Patent Number: 5,905,857
[45] Date of Patent: May 18, 1999

[54] SAFESTORE PROCEDURE FOR EFFICIENT RECOVERY FOLLOWING A FAULT DURING EXECUTION OF AN ITERATIVE EXECUTION INSTRUCTION

[75] Inventors: Wayne R. Buzby, Phoeniz; Ronald W. Yoder, Mesa; John E. Wilhite, Glendale, all of Ariz.

[73] Assignee: Bull HN Information Systems Inc., Billerica, Mass.

[21] Appl. No.: 08/820,814

[22] Filed: Mar. 19, 1997

Related U.S. Application Data

[60] Provisional application No. 60/031,918, Dec. 3, 1996, and provisional application No. 60/033,007, Dec. 16, 1996.
[51] Int. Cl.$^6$ .................................................. G06F 11/00
[52] U.S. Cl. ........................... 395/183.14; 395/183.07; 395/183.15; 395/183.18; 395/575
[58] Field of Search ..................... 395/184.01, 182.09, 395/183.01, 183.07, 183.14, 180, 575, 183.18, 185.01–185.4, 183.15

[56] References Cited

U.S. PATENT DOCUMENTS 5,063,497  11/1991  Cutler et al. ...................... 395/800.01
5,276,862   1/1994  McCulley et al. ...................... 395/575
5,557,737   9/1996  Wilhite et al. ...................... 395/182.04
5,649,088   7/1997  Hauck et al. ............................ 395/181
5,745,728   4/1998  Genduso et al. ........................ 395/453

Primary Examiner—Ayaz R. Sheikh
Assistant Examiner—Raymond N. Phan
Attorney, Agent, or Firm—James H. Phillips; John S. Solakian

[57] ABSTRACT

In order to gather, store temporarily and efficiently deliver (if needed) safestore information in a fault tolerant central processing unit having data manipulation circuitry including a plurality of software visible registers, a safestore memory for storing the contents of the plurality of software visible registers, after a data manipulation operation, is provided. Iterative execution instructions subject to a page fault are specially handled in that, during execution, status information indicative of the ongoing status and valid intermediate results are additionally stored in the safestore memory. Then, in the event of a page fault encountered during the execution of the iterative execution instruction, execution is suspended until access to a valid copy of the missing page is obtained. When a valid copy becomes available, the execution of the iterative execution instruction is restarted at the point at which the valid intermediate results had been obtained prior to occurrence of the page fault.

7 Claims, 17 Drawing Sheets

XRAM WORD 02

| BIT | FLAG | USE |
|---|---|---|
| 0 | XEQX | FAULT OCCURRED IN XEC OR XED SEQUENCE |
| 1 | XEDQ | FAULT OCCURRED IN XED SEQUENCE |
| 2 | XEDF | FAULT OCCURRED ON EXECUTION OF FIRST INST OF XED SEQUENCE |
| 3 | XECE | FIRST INST OF XED CONTAINED AN XEC INST |
| 4 | XECO | SECOND INST OF XED CONTAINED AN XEC INST |
| 5 | INDCY | FAULT OCCURRED IN INDIRECT CYCLE SEQUENCE |
| 6 | RPT-A | RPD, RPL, RPT (EVEN) INST HAS PROGRESSED TO UPDATING $X_N$, X0 |
| 7 | RPT-B | RPD (ODD) INST PROGRESSED TO UPDATING $X_N$ |
| 8 | RPD-FIRST | FAULT OCCURRED IN INDIRECT CYCLE SEQUENCE |
| 9 | RPD | FAULT OCCURRED DURING RPD INST |
| 10_13 | XEC-ODR | XEC ODR POINTER |
| 14_17 | XED-OCR | XED ODR POINTER |
| 18_20 | N/U | ZEROS |
| 21 | TALLY-CTL | TALLY OPERATION OCCURRED IN INDIRECT SEQUENCE |
| 22 | TALLY-HLD | TALLY RUNOUT OCCURRED IN LAST TALLY OPERATION |
| 23 | IRFLAG | IR MOD OCCURRED IN INDIRECT SEQUENCE |
| 24_29 | S-TAG | TAG OF LAST IR MOD |
| 30_35 | TAGS | TAG OF LAST INDIRECT FETCH |

FIG. 5

SAFESTORE PROCEDURE FOR EFFICIENT RECOVERY FOLLOWING A FAULT DURING EXECUTION OF AN ITERATIVE EXECUTION INSTRUCTION

CROSS REFERENCE TO RELATED PROVISIONAL APPLICATIONS

This application claims the benefit of the filing dates of U.S. Provisional patent application Ser. No. 60/031,918, filed Dec. 3, 1996, entitled DEMAND PAGING FOR REPEATS AND EXECUTE INSTRUCTIONS by Wayne Buzby et al and U.S. Provisional patent application Ser. No. 60/033,007, filed Dec. 16, 1996, entitled MULTIPROCESSOR COMPUTER SYSTEM EMPLOYING PRIVATE CACHES FOR INDIVIDUAL CENTRAL PROCESSOR UNITS AND A SHARED CACHE by William A. Shelly et al.

FIELD OF THE INVENTION

This invention relates to computer central processors and, more particularly, to the repetitive temporary storage of central processing register contents and other information in a safestore in order to facilitate recovery from a fault or transfer to another domain. Still more particularly, this invention relates to a safestore feature which restarts certain instructions, after a page fault, at an intermediate stage of execution.

BACKGROUND OF THE INVENTION

As personal computers and workstations become more and more powerful, makers of mainframe computers have undertaken to provide features which cannot readily be matched by these smaller machines in order to stay viable in the marketplace. One such feature may be broadly referred to as fault tolerance which means the ability to withstand and promptly recover from hardware faults and other faults without the loss of crucial information. The central processing units of mainframe computers typically have error and fault detection circuitry, and sometimes error recovery circuitry, built in at numerous information transfer points in the logic to detect and characterize any fault which might occur.

The CPU(s) of a given am computer comprises many registers logically interconnected to achieve the ability to execute the repertoire of instructions characteristic of the computer. In this environment, the achievement of genuinely fault tolerant operation, in which recovery from a detected fault can be instituted at a point in a program immediately preceding the faulting instruction/operation, requires that one or more recent copies of all the software visible registers be maintained and constantly updated. This procedure is typically carried out by reiteratively sending copies of the registers (safestore information) to a special, dedicated memory or memory section. Sometime, two safestore memories are provided to receive and temporarily alternately store two recent, but one always more recent, copies of the software visible registers. When a fault occurs and analysis (performed, for example, by a service processor) determines that recovery is possible, the safestore information is used to reestablish the software visible registers in the CPU with the contents held recently before the fault occurred so that restart can be tried from the corresponding place in program execution.

Those skilled in the art are aware of certain drawbacks to the usual provision of safestore capability, which drawbacks directly adversely affect CPU performance. Thus, as higher levels of CPU performance are sought, the performance penalty resulting from the incorporation of safestore techniques to enhance fault tolerance must be more closely considered. One source of performance penalty experienced with the use of safestore techniques is that certain instructions which execute iteratively may have been well along in the execution of a series of operations and already obtained meaningful results when a fault is experienced. In particular, a fault often experienced in the execution of these iterative execution instructions is a simple page fault or cache miss on a required information item. In the past, a page fault during such execution resulted in the usual steps to acquire the missing page from a main memory or wherever a valid copy is available, place it in the local cache memory and eventually restart the iterative execution instruction from the beginning, thus losing the valid intermediate results already obtained.

The performance penalty can be in the hundreds of clock cycles each time an iterative execution instruction encounters a simple page fault. While this is not a design error, the resultant performance penalty is an obstacle to attaining the desired CPU speed level necessary to maintain competitiveness in the market. The subject invention is directed to the alleviation of this limitation.

OBJECTS OF THE INVENTION

It is therefore a broad object of this invention to provide, in a central processor, fault tolerant operation in which the storage and recovery of safestore information takes place without a performance penalty.

It is a more specific object of this invention to provide a fault tolerant central processing unit in which safestore operation during the performance of an iterative execution instruction saves sufficient information to permit restart, after a page fault is encountered, of the iterative execution at an intermediate stage of its performance so as to preserve intermediate valid results already obtained prior to the occurrence of the page fault.

SUMMARY OF THE INVENTION

Briefly, these and other objects of the invention are achieved, in a fault tolerant central processing unit having data manipulation circuitry including a plurality of software visible registers, by providing a safestore memory for storing the contents of the plurality of software visible registers, after a data manipulation operation, in order to facilitate restart after a detected fault by transferring the corresponding contents of the safestore memory back to the software visible registers during recovery from the detected fault. More particularly, iterative execution instructions subject to a page fault are specially handled in that, during the execution of an iterative execution instruction, status information indicative of the ongoing status and valid intermediate results of the execution of the iterative execution instruction are additionally stored in the safestore memory. Then, in the event of a page fault encountered during the execution of the iterative execution instruction, execution of the iterative execution instruction is suspended until access to a valid copy of the missing page is obtained. When a valid copy becomes available, the execution of the iterative execution instruction is restarted at the point at which the valid intermediate results had been obtained prior to occurrence of the page fault.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 5 is a table showing the location of certain flags stored in a predetermined word in the safestore frame to facilitate the practice of the invention in the exemplary environment;

DESCRIPTION OF THE PREFERRED EMBODIMENT(S)

Figure 1:
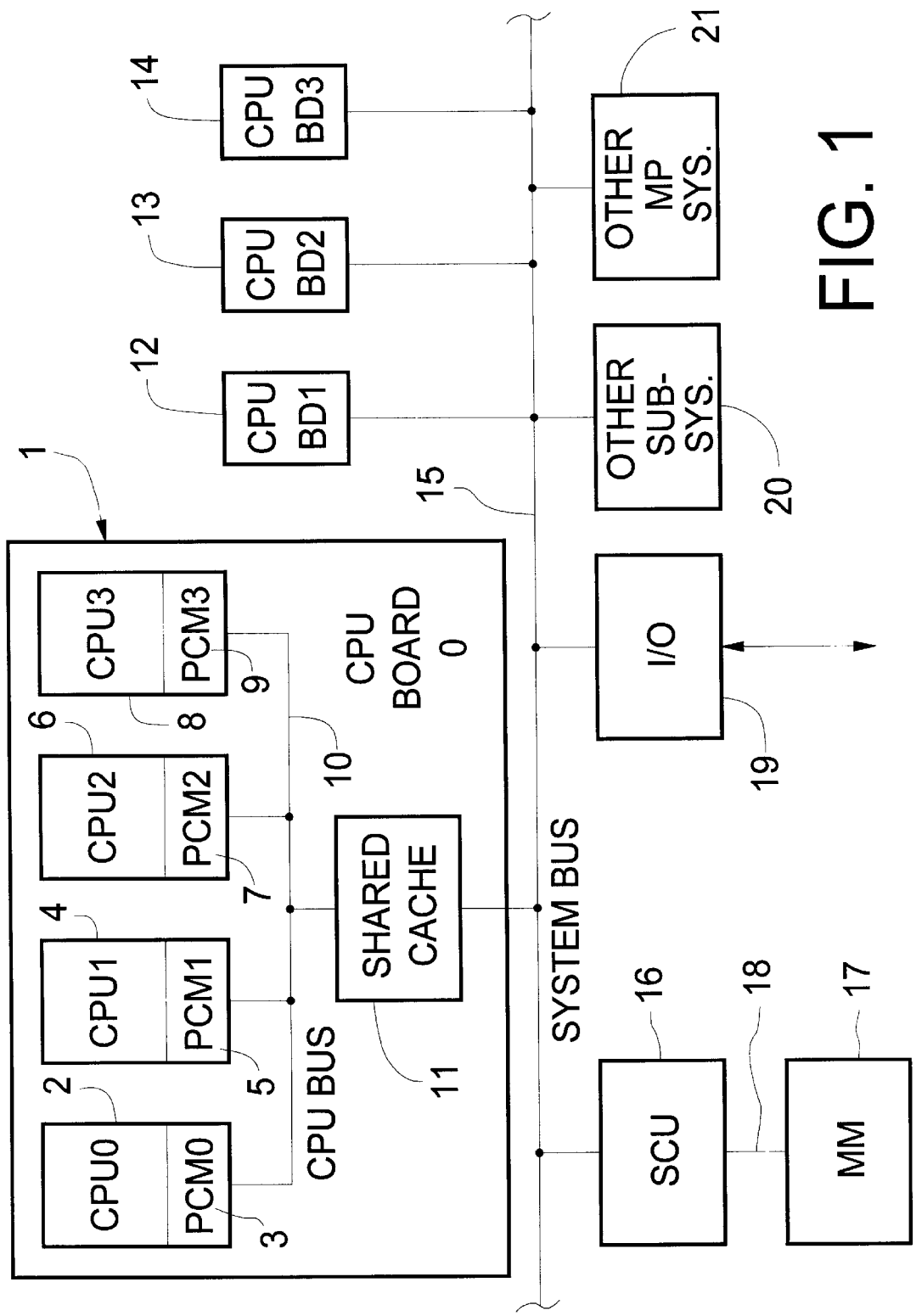
FIG. 1 is a high level block diagram of an multiprocessor computer system which is an exemplary environment for practicing the invention.

Attention is first directed to FIG. 1 which is a high level block diagram of an exemplary multiprocessor computer system incorporating the invention. A first CPU board (CPU Board "0") 1 includes four central processor units 2 (CPU "0"), 4 (CPU "1"), 6 (CPU "2"), 8 (CPU "3"). Each of the central processor units 2, 4, 6, 8 situated on the first CPU board 1 includes an integral private cache memory module, 3, 5, 7, 9, respectively. The private cache modules 3, 5, 7, 9 are each configured as "store into"; i.e., the results of each completed operation performed in the CPU are stored into the private cache. Each of the private cache modules 3, 5, 7, 9 on CPU Board "0" 1 interface with a CPU bus 10 for direct communications between the CPUs 2, 4, 6, 8.

In the exemplary system, there are three additional CPU boards 12 (CPU Board "1"), 13 (CPU Board "2") and 14 (CPU Board "3"), each of which is substantially identical to CPU board 1 although those skilled in the multiprocessor art will understand that each CPU board and each CPU on each of the boards is assigned a unique identification number to facilitate communication and cooperation among the CPUs in the system.

CPU board 1 (i.e., CPU Board "0") also includes a shared cache 11 disposed between ("bridging") the CPU bus 10 and a system bus 15. It will be understood that each of the CPU boards 12, 13, 14 also each includes a CPU bus and a shared cache, identically oriented.

A system control unit 16 serves to couple the system bus 15 to a main memory unit 18 via a memory bus 17. In addition, one or more input(output units 19 interface the system bus 15 with various input/output subsystems, not shown, to achieve input/output functions on a system basis, all as well known to those skilled in the art. Similarly, other subsystems 20, not otherwise specified or shown, may be connected to the system bus 15 to complete a given multiprocessor system, and other, complete, multiprocessor systems, represented by the block 21, may also communicate with the multiprocessor system depicted in FIG. 1 via the system bus 15. System control unit 16 also conventionally provides a multi-phase clock to all the system units.

Figure 2:
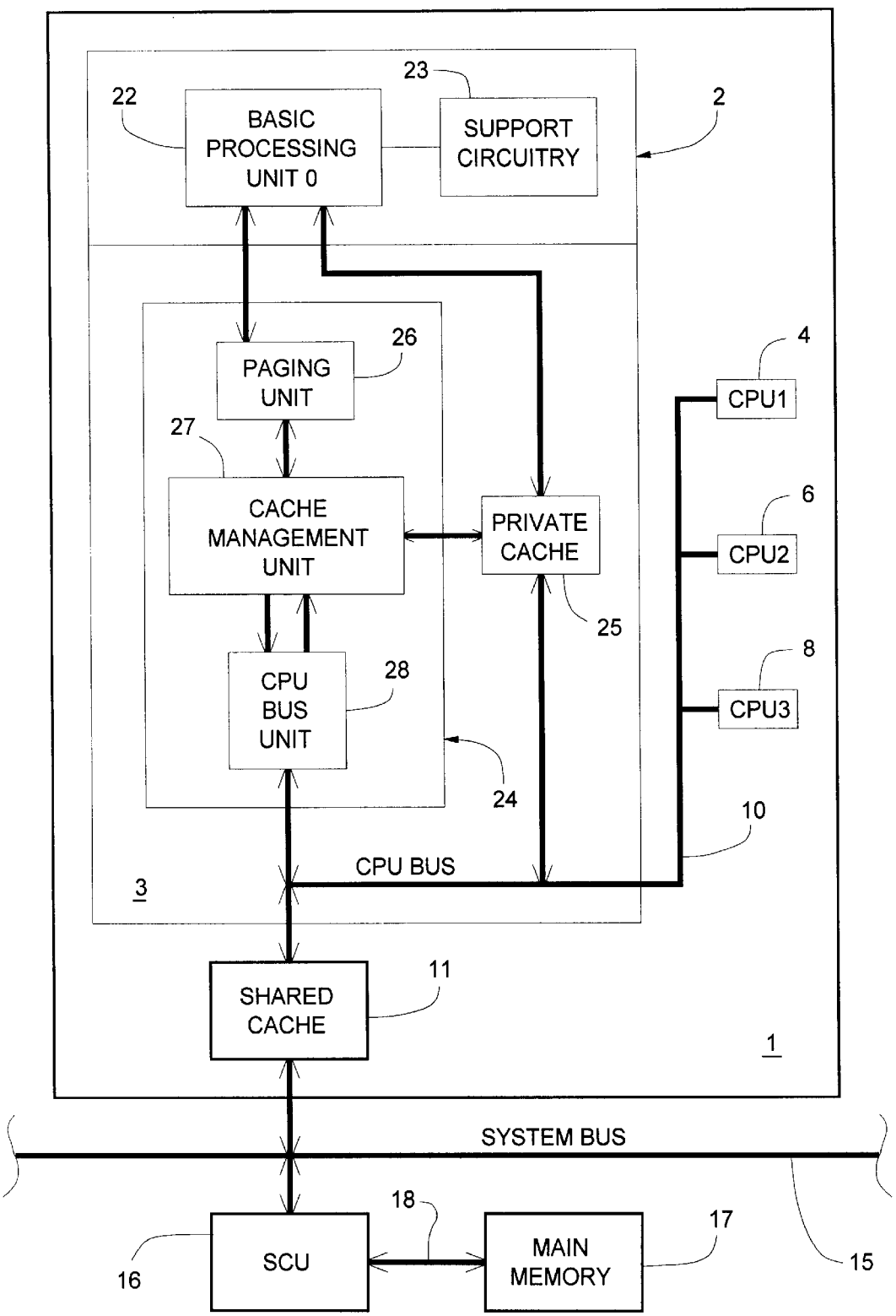
FIG. 2 is a slightly lower level block diagram showing additional details of an exemplary CPU board in the multiprocessor system of FIG. 1.

FIG. 2 is a slightly lower level block diagram of CPU "0" 2 of CPU board 1 (CPU Board "0") illustrating additional structure which is present in each CPU in the system. CPU "0" 2 includes a basic processing unit 22 and support circuitry 23 therefor.

As previously described, CPU "0" 2 also includes private cache module "0" 3 which constitutes a cache control unit 24 and a private cache 25 (which itself includes additional logic to be described below). Cache control unit 24 includes paging unit 26, cache management unit 27 and CPU bus unit 28. Paging unit 26 interfaces with basic processing unit "0" 22 and cache management unit 27. Cache management unit 27 also interfaces with private cache memory 25 and CPU bus unit 28. CPU bus unit also interfaces with CPU bus 10 and, via CPU bus 10, shared cache 11. Private cache 25 is also coupled directly to receive information from and send information to the CPU bus 10 and to receive information from and send information to basic processing unit "0" 22.

As previously described, shared cache 11 also interfaces with system bus 15 and, via system bus 15, with system control unit 16 and other systems/subsystems shown in FIG. 1. Main memory 17 may be accessed via the system control unit 16 and memory bus 18.

It will be seen that there are numerous paths for information flow among the various blocks shown in FIGS. 1 and 2. The types of information may include control, address, instructions and operands. A given CPU may directly access its own private cache module and indirectly access the private cache modules incorporated into the other CPUs on a shared CPU board. Thus, CPU "0" 2 can access, via the CPU bus 10, the shared cache 11 it shares with CPU "1" 4, CPU "2" 6 and CPU "3" 8. CPU "0" 2 can also, under defined conditions, access the private cache module of CPU "2" 6 (for example) via the CPU bus 10 to effect a local "siphon". Further, CPU "0" 2 can access (via CPU bus 10, shared cache 11 and system bus 15) the shared caches (not shown) on each of CPU Board "1" 12, CPU Board "2" 13 and CPU Board "3" 14. Still further, a given CPU may indirectly access the private cache modules (not shown) of a CPU (not shown) on another CPU board; e.g., CPU "0" on CPU board 1 (CPU Board "0") may, under defined conditions, access the private cache module of any one of the CPUs on CPU Board "2" 13 (FIG. 1) via CPU bus 10, shared cache 11, system bus 15 and the shared cache on CPU Board "2" to effect a remote "siphon".

Further yet, for example, CPU "0" 2 can access main memory 17 via CPU bus 10, shared cache 11, system bus 15, SCU 16 and memory bus 18. Still further, for example, CPU "0" 2 can access, via CPU bus 10, shared cache 11 and system bus 15, any other block shown coupled to the system bus 15 in FIG. 1 to achieve bilateral communication with input/output devices, other subsystem components and even other multiprocessor systems.

Most of these accesses can be either read or write and can be in either direction. Therefore, those skilled in the art will understand that not only must access request conflicts be conclusively resolved, but coherence among the private caches modules, shared caches and main memory must be unerringly maintained. As notoriously well known in the art, achievement of absolute coherence is an extraordinarily difficult process which becomes geometrically more complex as the number of communicating entities increases.

Detailed structure and a comprehensive discussion of the operation of the exemplary private cache 3 is included in copending U.S. patent application Ser. No. 08/796,309, entitled MULTIPROCESSOR COMPUTER SYSTEM INCORPORATING METHOD AND APPARATUS FOR DYNAMICALLY ASSIGNING OWNERSHIP OF CHANGEABLE DATA, by Elisabeth Vanhove et al, filed Feb. 7, 1997, incorporated by reference herein.

Figure 3:
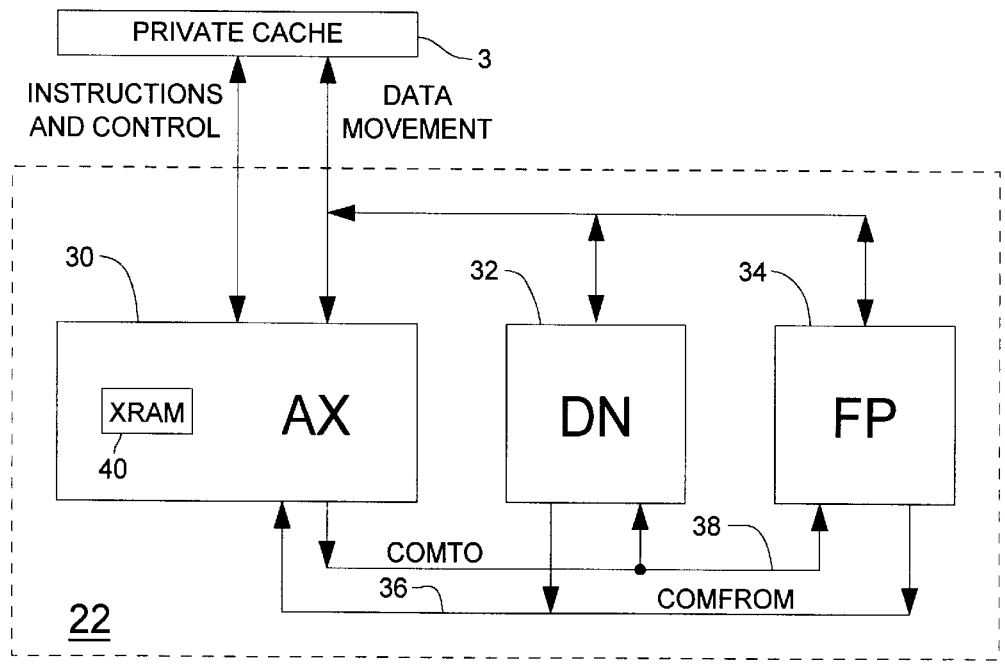
FIG. 3 is a block diagram showing additional details of a basic processing unit including within each CPU on the CPU board shown in FIG. 2.

FIG. 3 is a block diagram which includes additional details of a basic processing unit 22 in a system incorporating the present invention. The Address and Execution (AX) unit 30 is a microprocessing engine which performs all address preparation and executes all instructions except decimal arithmetic, binary floating point and multiply/divide instructions. The main functions performed by the AX unit 30 include:

effective and virtual address formation;

memory access control;

security checks;

register change/use control;

execution of basic instructions, shift instructions, security instructions, character manipulation and miscellaneous instructions; and CLIMB safestore file.

Efficient scientific calculation capability is implemented in the Floating Point (FP) coprocessor unit 34. The FP unit 34 executes all binary floating point arithmetic. This unit, operating in concert with the AX unit 30, performs scalar or vector scientific processing.

The FP unit 34:

executes all binary and fixed and floating point multiply and divide operations;

computes 12 by 72-bit partial products in one machine cycle;

computes eight quotient bits per divide cycle;

performs modulo 15 residue integrity checks;

executes all floating point mantissa arithmetic;

executes all exponent operations in either binary or hexadecimal format;

preprocesses operands and post-processes results for multiply and divide instructions; and provides indicator and status control.

The DN unit 32 performs the execution of decimal numeric Extended Instruction Set (EIS) instructions. It also executes Decimal-to-Binary (DTB), Binary-to-Decimal (BTD) conversion EIS instructions and Move-Numeric-Edit (MVNE) EIS instructions in conjunction with the AX unit 30. The DN unit both receives operands from and sends results to the private cache 3. A COMTO ("command to") bus 38 and a COMFROM ("command from") bus 36 couple together the AX unit 30, the DN unit 32 and the FP unit 34 for certain interrelated operations.

The AX unit 30 includes an XRAM 40 which is a small (e.g., 16×72) random access memory used for certain scratchpad operations and, of direct relevance to the present invention, to store safestore information. Thus, the contents of the XRAM 40 are constantly updated with, for example, duplicates of the contents of software visible registers such that, in the event of the occurrence of a fault from which recovery has been determined to be possible (as by a service processor, not shown), processing may be restarted at a point just prior to the fault by transferring the most recent register set stored in the XRAM 40 back to reestablish the register set.

The straightforward use of a safestore is known in the prior art as exemplified by U.S. Pat. No. 5,276,862, entitled SAFESTORE FRAME IMPLEMENTATION IN A CENTRAL PROCESSOR by Lowell D. McCulley et al; U.S. Pat. No. 5,553,232, entitled AUTOMATED SAFESTORE STACK GENERATION AND MOVE IN A FAULT TOLERANT CENTRAL PROCESSOR by John E. Wilhite et al; and U.S. Pat. No. 5,557,737 entitled AUTOMATED SAFESTORE STACK GENERATION AND RECOVERY IN A FAULT TOLERANT CENTRAL PROCESSOR by John E. Wilhite et al, all incorporated by reference herein for their disclosure of the repetitive storage of safestore information in a safestore memory and the use of safestore information in recovery from a fault.

Figure 4:
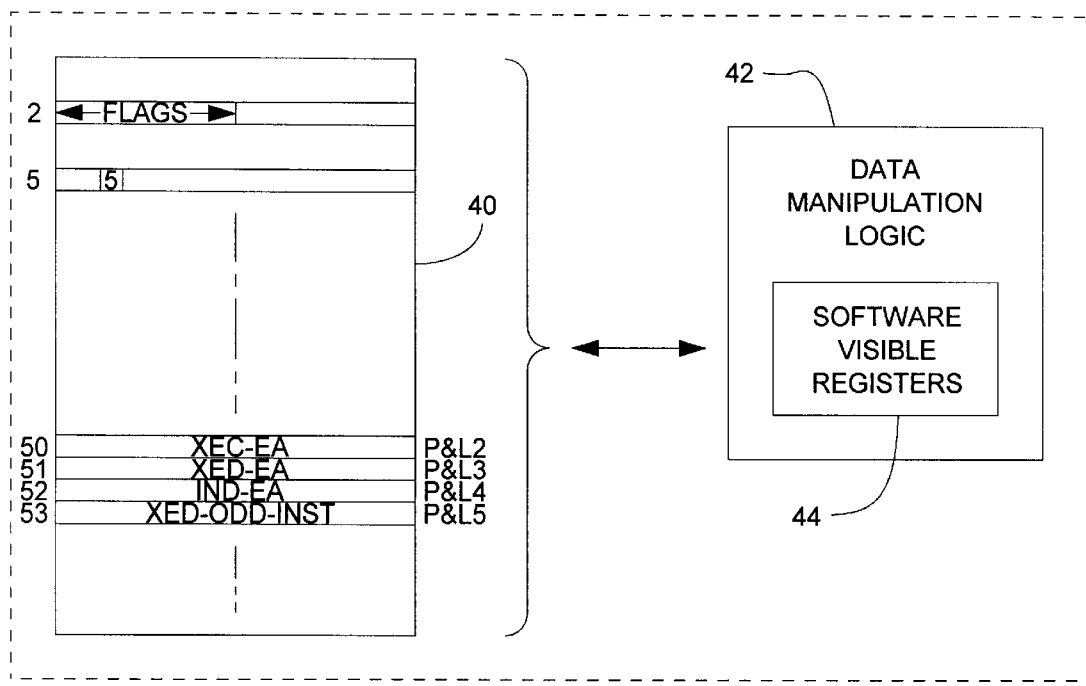
FIG. 4 is a revised block diagram of the basic processing unit particularly showing the relationship of an XRAM to the basic processing unit and its software visible registers in accordance with the subject invention.

As previously noted, the AX unit 30, DN unit 32 and FP unit 34 are, collectively, referred to as the basic processing unit (BPU) 22. Referring now to FIG. 4, it will be understood that the AX unit 30, (except for the XRAM 40), DN unit 32 and FP unit 34 and their support circuitry 23 (FIG. 2) are represented by the data manipulation logic block 42 in order that the XRAM 40 can be discussed in greater detail in the following discussion of the invention.

A correctable fault which occurs very often is a page fault. When a requested memory page is missing from the private cache 3 (FIGS. 2 and 3), then the paging unit 26 (FIG. 2) senses this condition, and the memory page must be acquired elsewhere in the system as previously described in order that the instruction being executed when the page fault occurred can be retried. In the past, a simple page fault has resulted in not only postponement of the execution of the faulting instruction, using the safestored information, but also a full restart when a valid copy of the missing page is brought into the private cache 3. That is, if the execution of the faulting instruction was partially completed prior to the page fault, execution of the instruction is nonetheless restarted from the beginning such that valid intermediate results previously obtained are discarded. Accordingly, there is a certain redundancy of operations by the data manipulation logic 42 in obtaining the completed execution of the faulting instruction.

For most instructions, this redundancy of operations has little effect on performance of a central processing unit, typically amounting to only a few clock cycles. However, there are classes of instructions in which a significant penalty, sometimes in the hundreds of clock cycles, in performance of the central processing unit result from the requirement that execution of a faulting instruction must be restarted from the beginning.

In accordance with the present inventions, REPEAT instructions, EXECUTE (and EXECUTE DOUBLE specifying even and odd number instructions for execution) instructions and instructions which use INDIRECT address modification are not restarted from the beginning after the correct memory page is established by the operating system. Rather, these instructions types are restarted at the mid-instruction execution point at which it is determined that essential data is not available in the private cache and a missing page fault is taken. As well known in the art, REPEAT instructions, EXECUTE and EXECUTE DOUBLE instructions and instructions which use INDIRECT address modification execute other instructions in an iterative fashion. Accordingly, system performance can be significantly enhanced if the state of execution of one of these instructions is saved at the point when the missing page fault occurs and restarted from the point of interruption rather than from the beginning.

In accordance with the invention, decisions are made as to what should be saved for the REPEAT or EXECUTE (or EXECUTE DOUBLE) or INDIRECT address modification instructions (hereinafter, "iterative execution instructions"). This data is retained along with the standard fault data in a safestore frame in XRAM 40 and is used to restore the faulting execution instruction back to the mid-instruction interrupt point. Thus, substantive data manipulation that has already completed successfully during the execution of an execution instruction is not discarded. The processes for achieving this end are collectively named the demand paging restart processes.

The format of the additional information stored in the XRAM 40 and pertaining to the potential restart of iterative execution instructions according to the invention is shown in general in FIG. 4 and in detail in FIG. 5. As best shown in FIG. 4, in the exemplary embodiment, various flags describing conditions used during the restart of an execution instruction are stored in half of word 02 of the XRAM in the exemplary embodiment, bit 5 of word 05 of the XRAM is a flag indicating whether a page fault has been taken and words 50–53 store pointer and lengths (P&L) information. FIG. S indicates in detail the flags stored in word 02 of the XRAM. It will be understood that this stored information is in addition to the software visible registers normally stored in a safestore, and this additional information is the basis of achieving the benefits of the present invention.

Figure 6A:
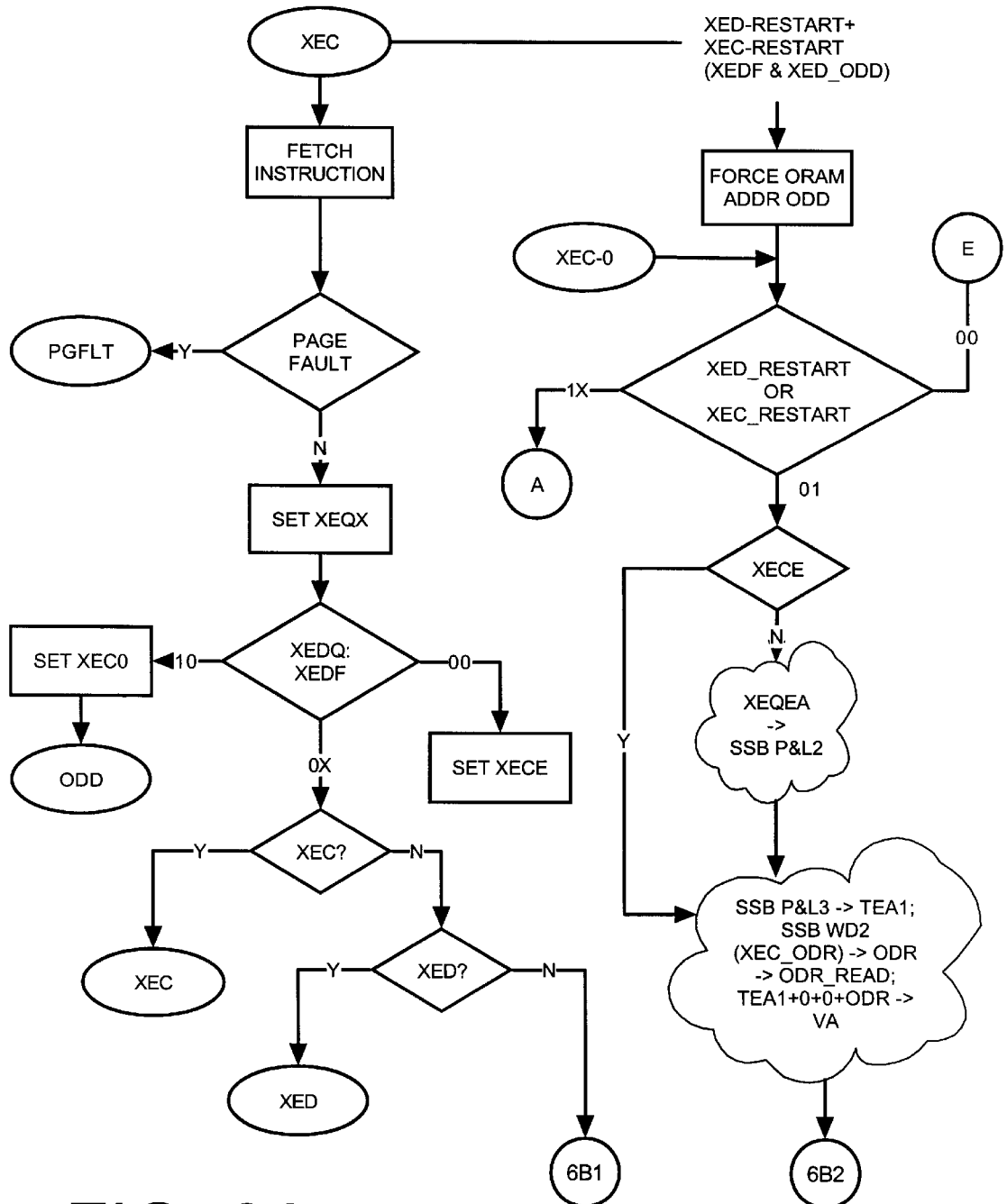
FIG. 6 is a process flow chart of the operation of an EXECUTE instruction which may encounter a page fault.
Figure 6B:
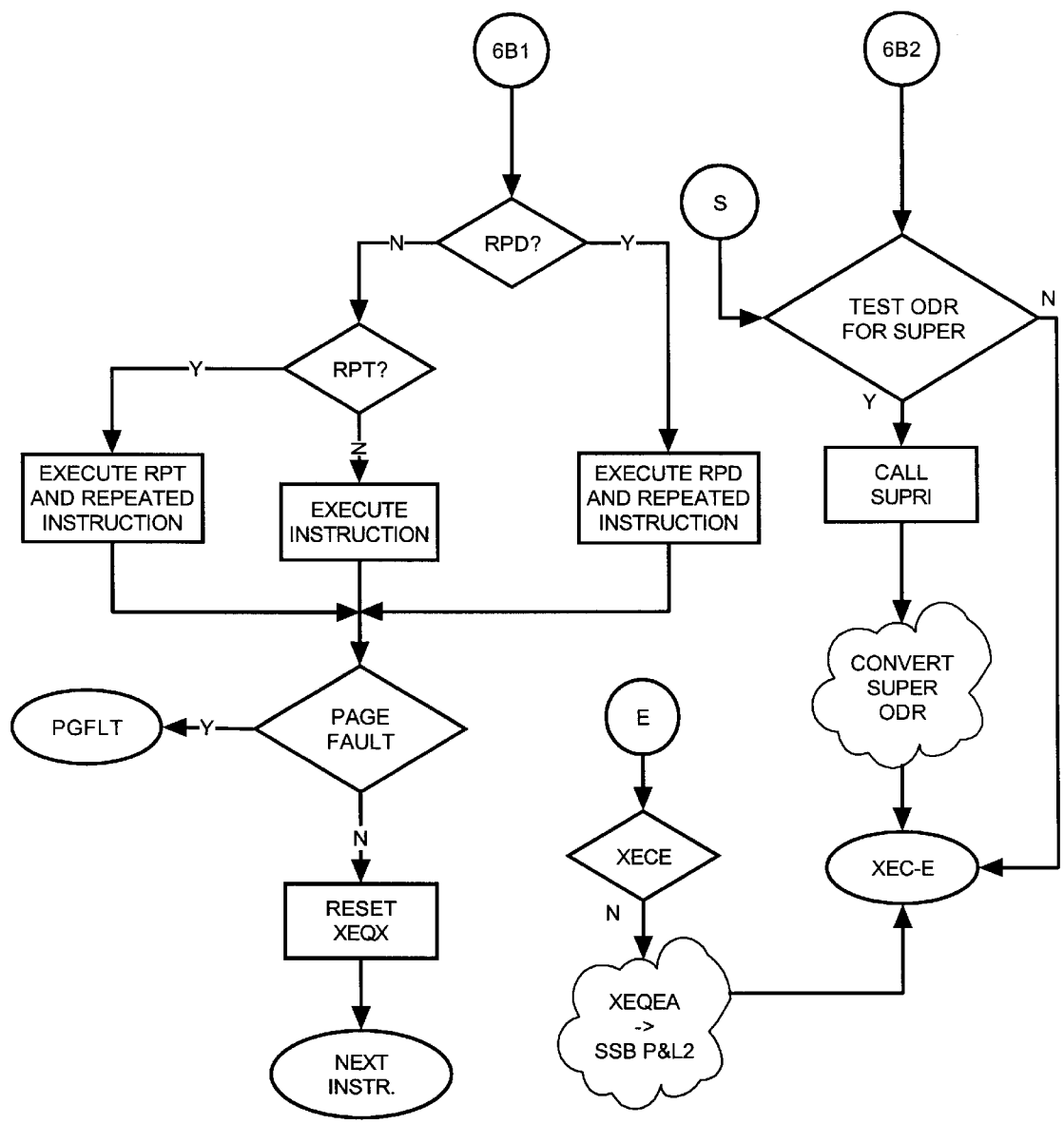

Attention is now directed to FIG. 6 which is a detailed process flow chart of operations which take place in the exemplary embodiment when a page fault is taken during execution of an EXECUTE- instruction. During the execution of an XEC (i.e., EXECUTE) instruction, an effective address (EA+ODR) as developed by the XEC instruction, is saved at the completion of the fetch for each executed instruction. When the executed instruction detects a page fault during it's own execution, the virtual address previously saved is stored in the P&L area of the XRAM 40. Referring to both FIGS. 4 and 5, the various status flags describing the type of instruction and the restart point are also saved in the XRAM 40.

During the restart process for an EXECUTE instruction which encountered a page fault and after the missing page has been acquired by the local private cache, the safestore frame data stored in the XRAM 40 is checked for a "FAULT-DURING-XEC" flag and, if present, the P&L data from the XRAM 40 will be retrieved and the XEC-RESTART flag set The injected transfer instruction will therefor enter the XEC instruction with the XEC-RESTART flag set causing the hardware to force the staring firmware address to an odd MROM location. (For a discussion of a microprogrammed CPU in which the step-by-step firmware is stored in MROM and BROM memories, see U.S. Pat. No. 5,568,622 entitled METHOD AND APPARATUS FOR MINIMIZING THE NUMBER OF CONTROL WORDS IN A BROM CONTROL STORE OF A MICROPROGRAMMED CENTRAL PROCESSOR by Wilbur Stewart et al.) This establishes a second entry point for the same instruction. This XEC second entry point firmware develops the viral address pointing to the executed instruction, based on the status flags and P&L data from the safestore before transferring to the normal XEC firmware to refetch the executed instruction which had the missing page fault.

Figure 7A:
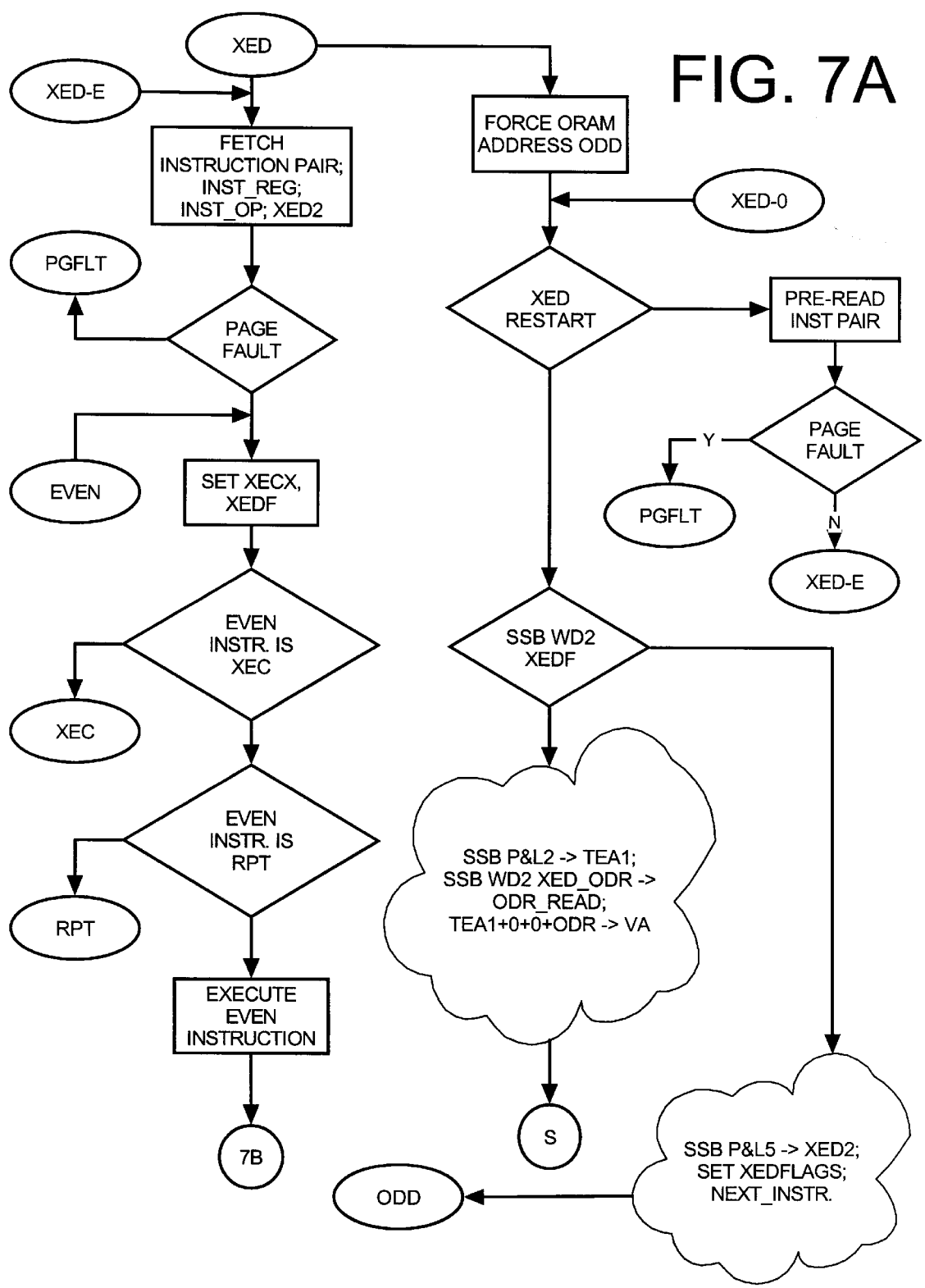
FIG. 7 is a process flow chart of the operation of an EXECUTE DOUBLE instruction which may encounter a page fault.
Figure 7B:
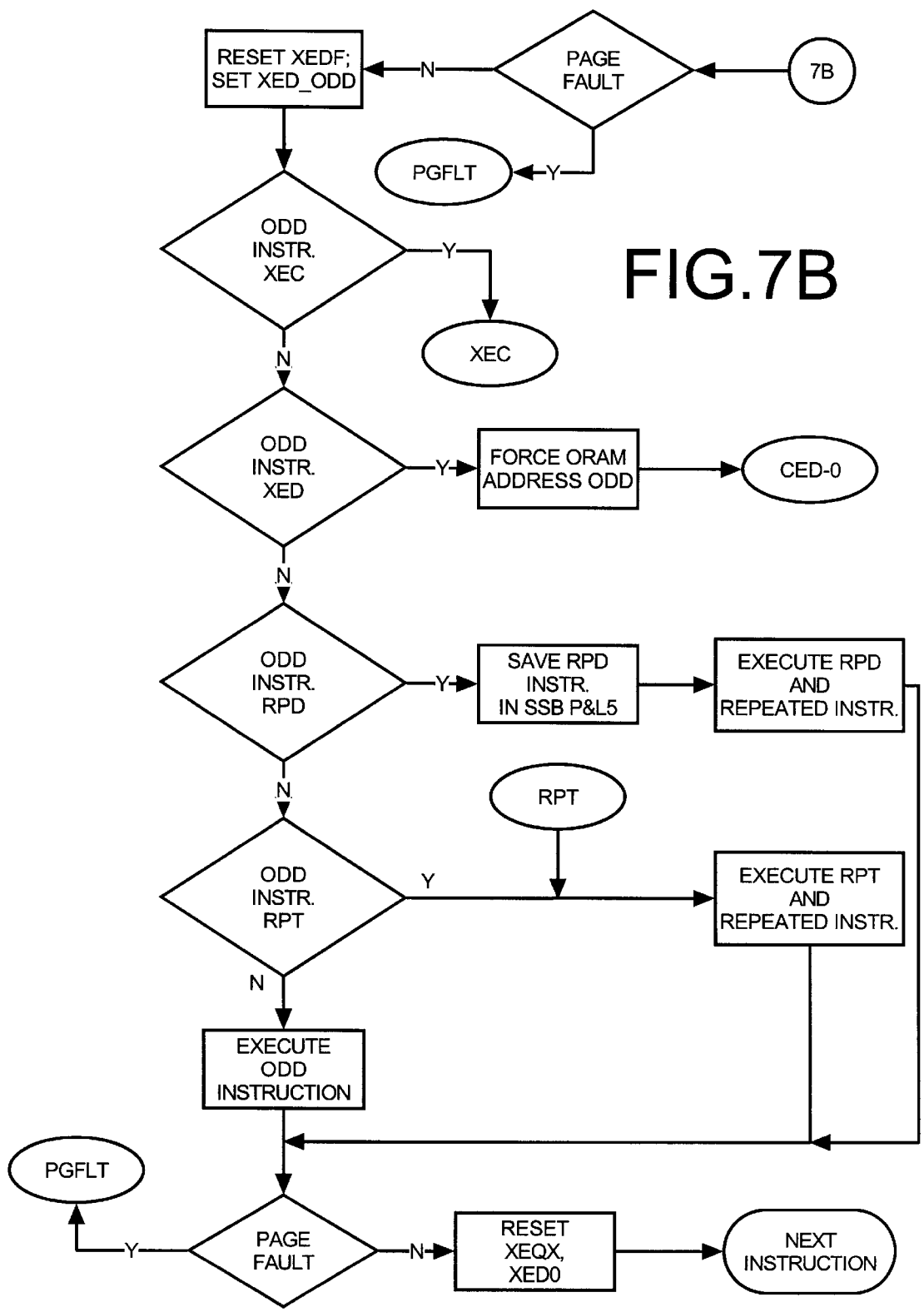

Similarly, with reference to FIG. 7 (which is a detailed process flow chart of operations within the AX unit 30 when a page fault is taken during execution of an EXECUTE DOUBLE instruction), during the execution of an XED (EXECUTE DOUBLE) instruction, the effective address (EA+ODR selected) as developed during execution of the XED instruction is saved at the completion of the fetch for the pair of executed instructions. When the EVEN instruction of the pair encounters a page fault during it's execution, the effective address pointing to the pair of instructions is saved in the P&L area of the safestore frame of the XRAM 40. When the ODD instruction of the pair encounters a page fault during its execution, then the effective address pointing to the ODD instruction of the pair is saved in the P&L area of the safestore frame.

During the restart of the XED instruction, the safestore data in XRAM 40 is checked for a "FAULT_DURING_XED" flag and, if present, retrieves the P&L data from XRAM 40 and sets the XED-RESTART flag. The injected transfer will thus enter the XED instruction with the XED-RESTART flag set causing the hardware to force the starting MROM firmware address to an odd location. This second firmware entry point for the XED will check the page fault status data in the safestore word 02 and restarts the XED instruction based on whether the fault occurred on the even instruction of the executed pair or on the odd instruction of the executed pair.

If the fault occurred on the even instruction, the (EA+ODR select) data from the safestore word 02, are used to generate a virtual address, and the normal XED (even) firmware flow is entered to refetch the pair of instructions. If the fault occurred on the odd instruction of the pair, the odd instruction is reloaded from the safestore P&L data into the XED2 (ODD INST) holding register. The XED flags are set, and a firmware command is issued to restart the odd instruction.

Because of hardware limitations on how much restart data can be saved in the main data path during instruction execution, a few special conditions may occur which require special firmware handing as follows:

1. In the case of an XEC instruction as the EVEN instruction of an XED pair: the hardware will force the XEC instruction to start at an ODD MOD4 firmware location. The firmware must then check to see if a previous XEC has already saved the viral address of the XED instruction, and IF NOT, the firmware must save this address in the safestore P&L data because the XEC instruction uses the same hardware registers to save its own virtual address.

2. In the case of an XED of a RPD instruction: The RPD is the odd instruction of the pair and must be saved in the safestore P&L area because the RPD uses the save hardware register to store the ODD repeated instructions.

3. In the case of an XED instruction as the ODD instruction of an XED pair of instructions: The hardware will force the XED to start at the odd MROM entry location. The firmware must PREREAD the pair of instructions to test for a page fault before transferring to the normal XED firmware flow because of a timing limitation that may overwrite the register holding the ODD instruction needed for recovery.

If more than one restart flag is set during the RCLIMB, the XED_RESTART is handled first, followed by the XEC- RESTART if necessary, and then either the RPT_RESTART or the IND_RESTART if necessary.

Figure 8A:
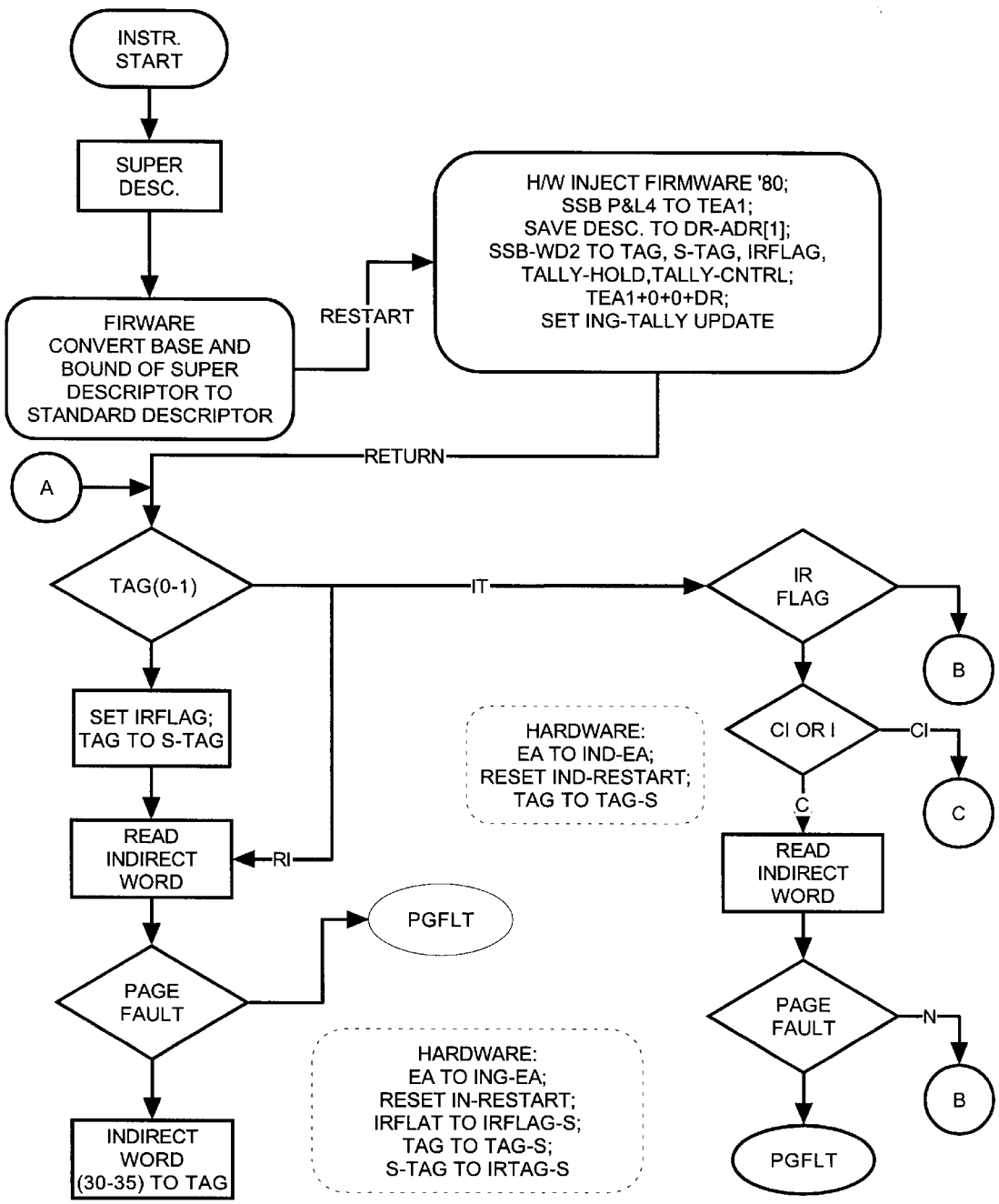
FIG. 8 is a process flow chart of the operation of an INDIRECT address modification restart operation.
Figure 8B:
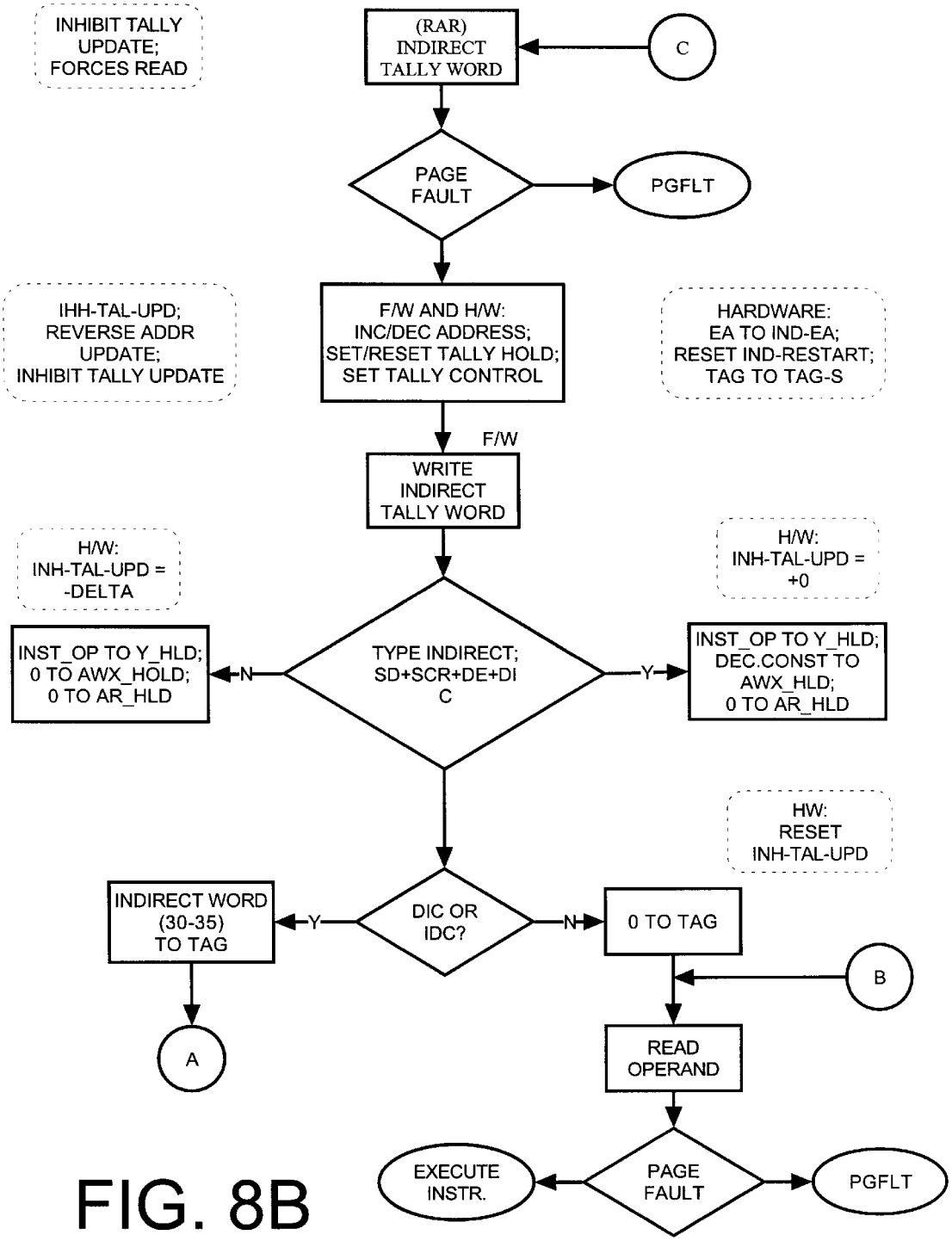

Referring to FIG. 8, which is a detailed process flow chart of indirect address modification restart, at the completion of each indirect cycle that does not encounter a page fault, the effective address (EA) and TAG of the instruction that was used to fetch the indirect word is saved along with the IR_FLAG and IR_TAG in the safestore. When a page fault occurs after a completed indirect cycle, but before the instruction execution, the saved data along with the TALLY control flags are saved in the safestore P&L area during the FCLIMB.

During the RCLIMB after the missing page has been obtained, the firmware checks the safestore P&L data for a "PAGE-FAULT DURING INDIRECT" condition and if necessary will set the IND_RESTART flag.

Restarting an instruction with the IND_RESTART flag set will cause the hardware to inject a predetermined starting firmware MROM address ("080" in the example). This injected firmware flow reloads the EA, TAG, IR_FLAG, IR_TAG and TALLY_CTL from the safestore and returns to the indirect firmware flow as a function of the restored tag.

This procedure results in the last good indirect cycle being repeated Indirect Tally word updates to the local private cache are inhibited, and the Indirect Tally address is adjusted to point to the operand.

Figure 9A:
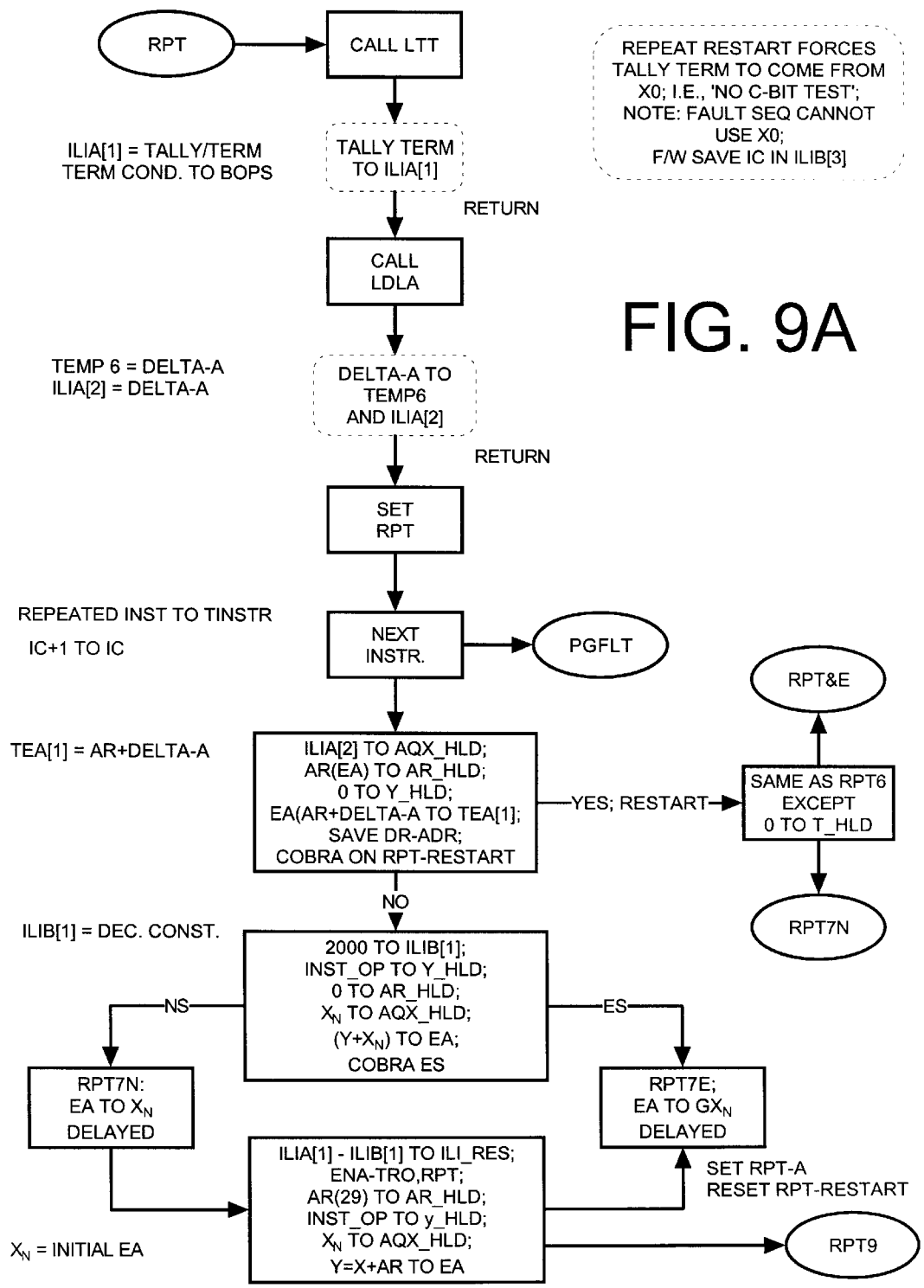
FIGS. 9A, 9B and 9C, taken together, constitute a process flow chart for a REPEATS demand paging flow in which the process may encounter a page fault.
Figure 9B:
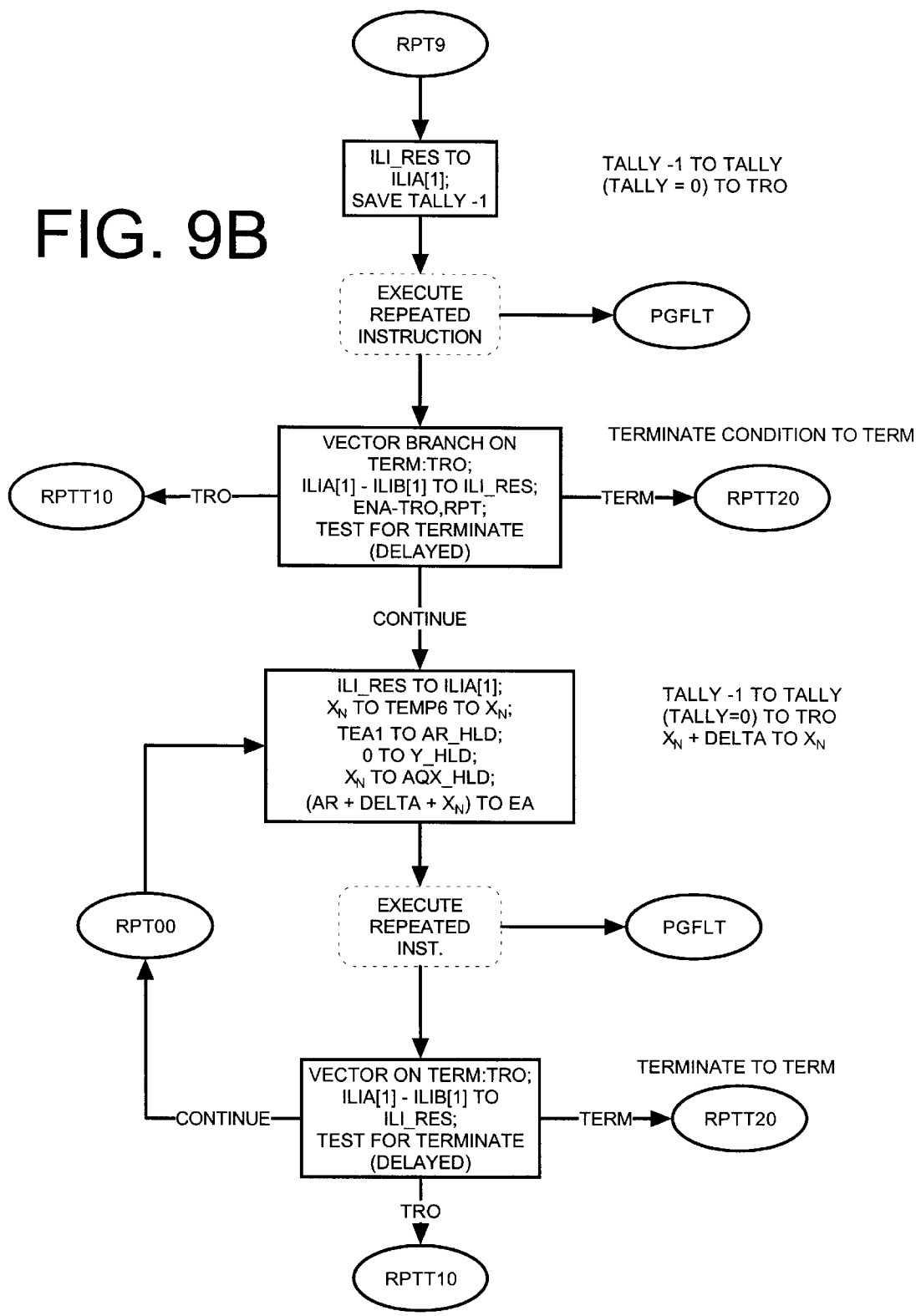
Figure 9C:
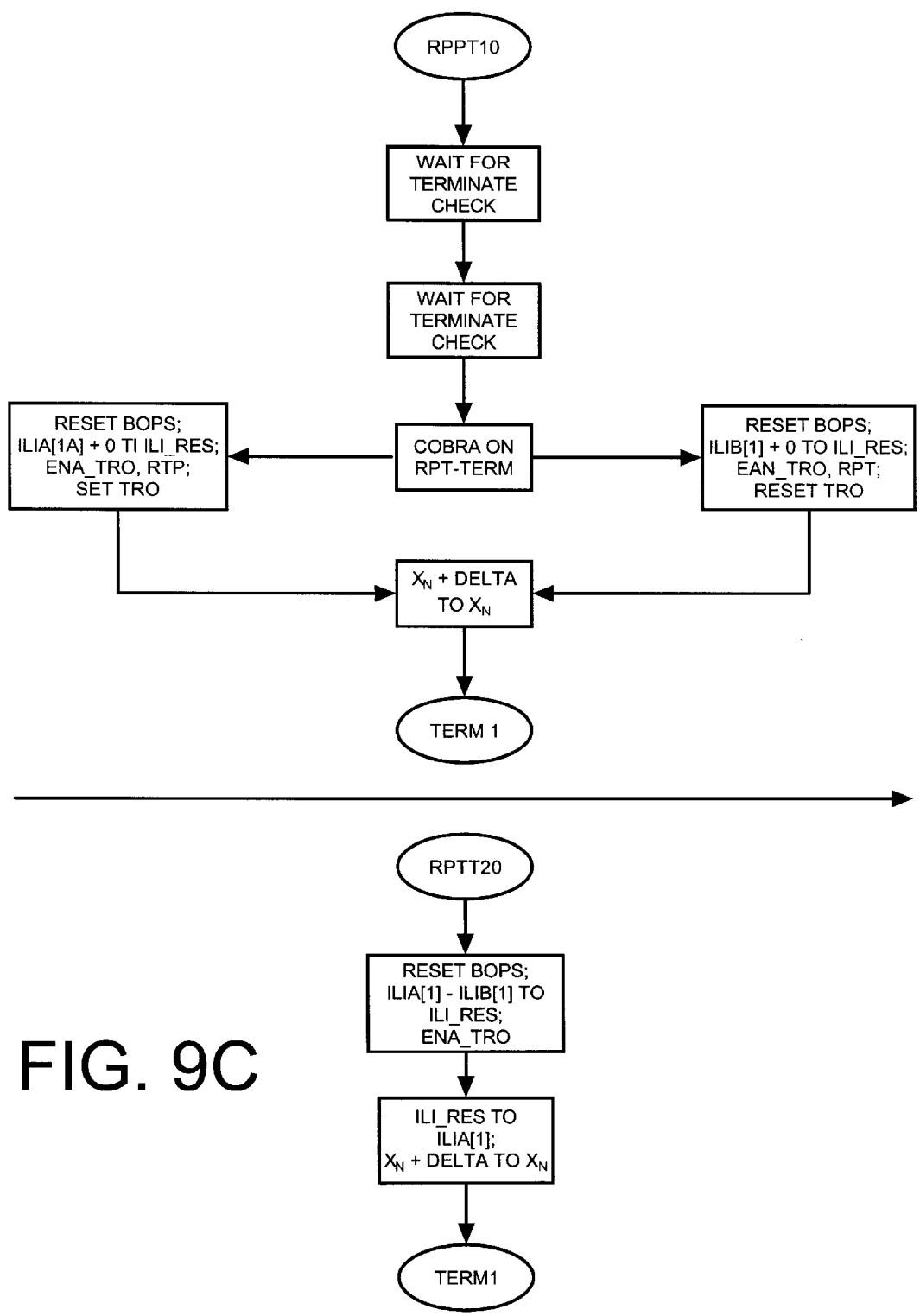
Figure 10A:
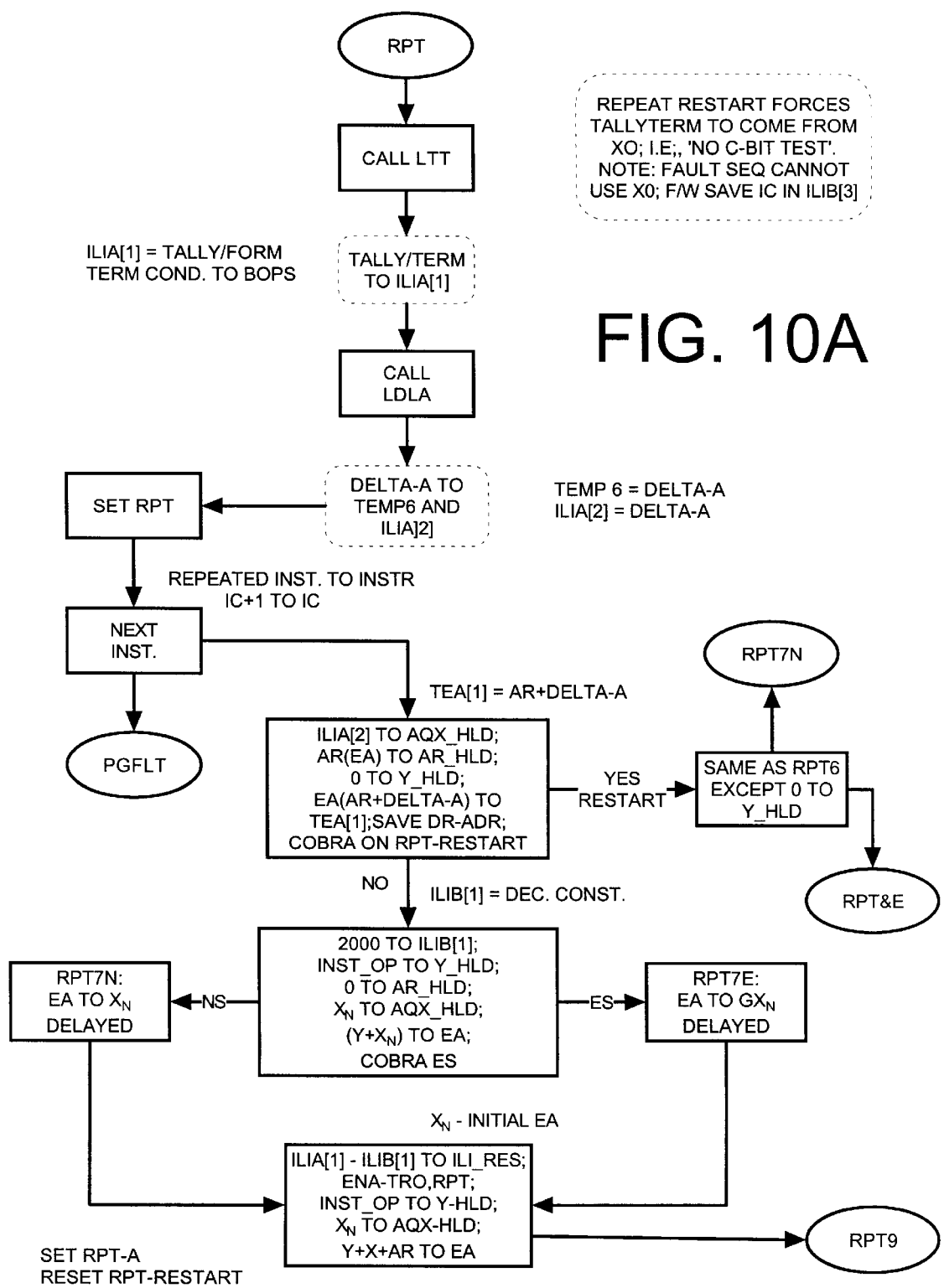
FIGS. 10A, 10B and 10C, taken together, constitute a process flow chart for a REPEATS link demand paging flow in which the process may encounter a page fault.
Figure 10B:
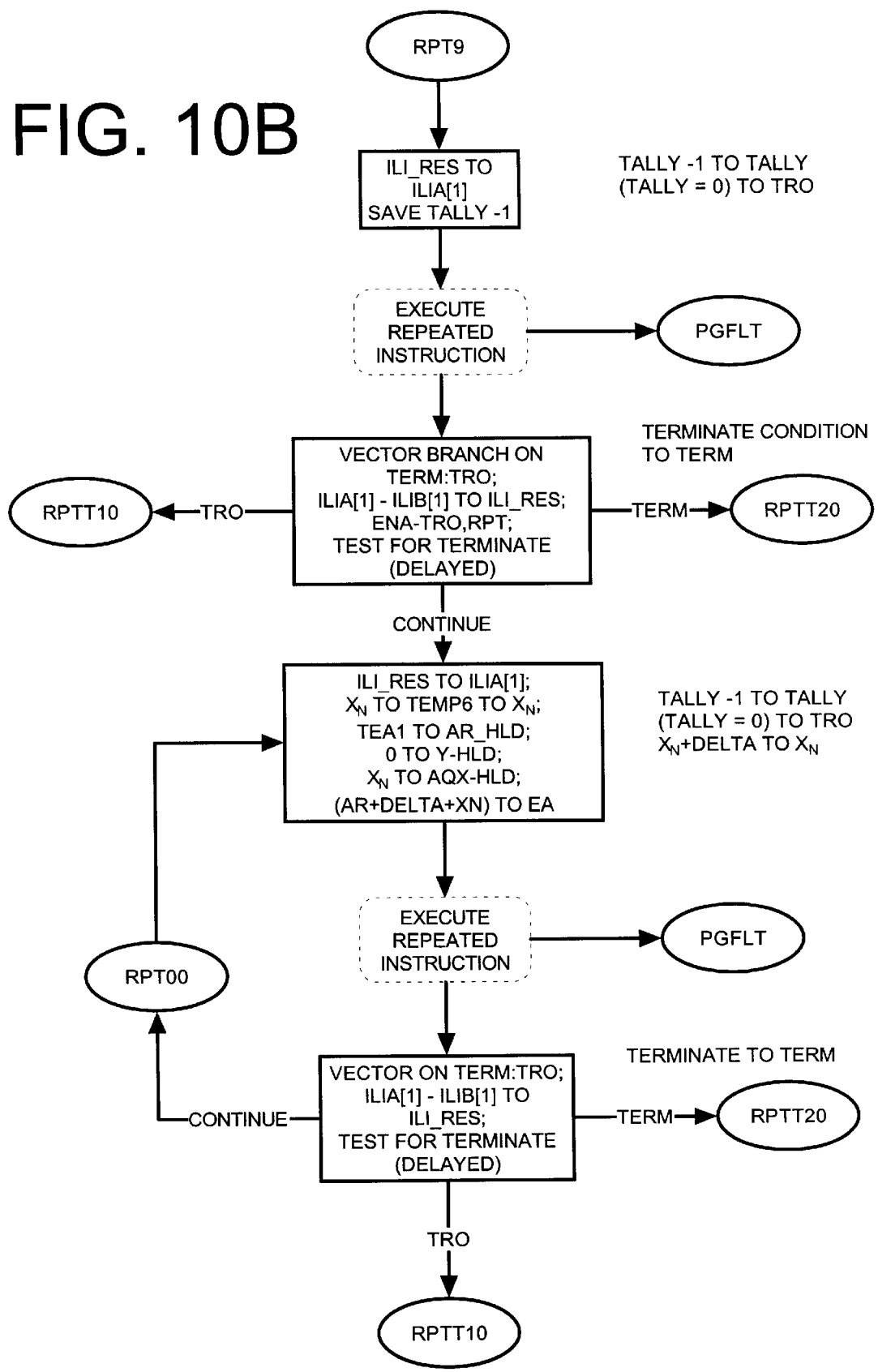
Figure 10C:
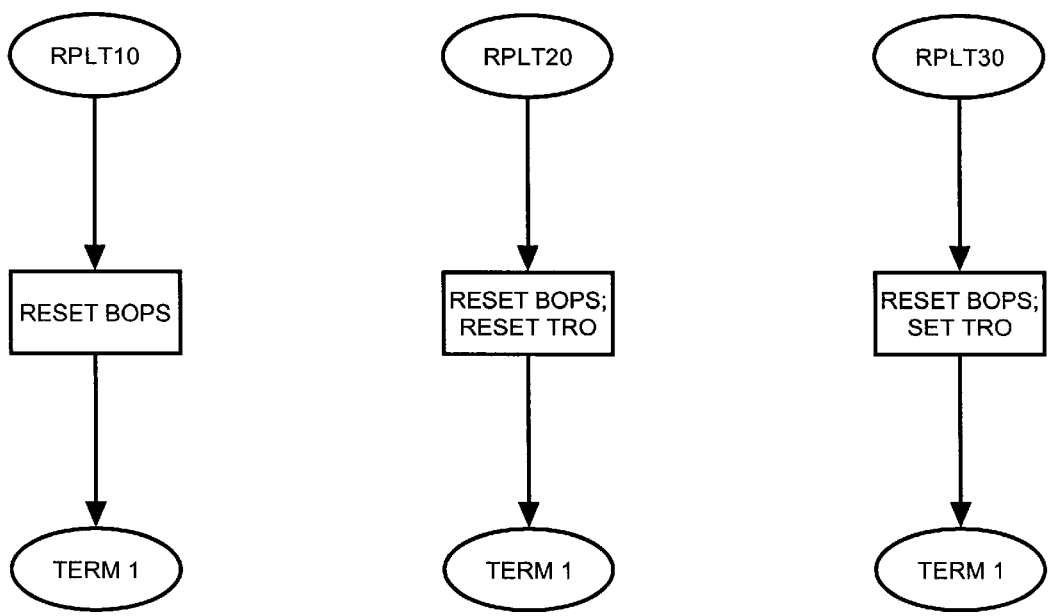
Figure 11:
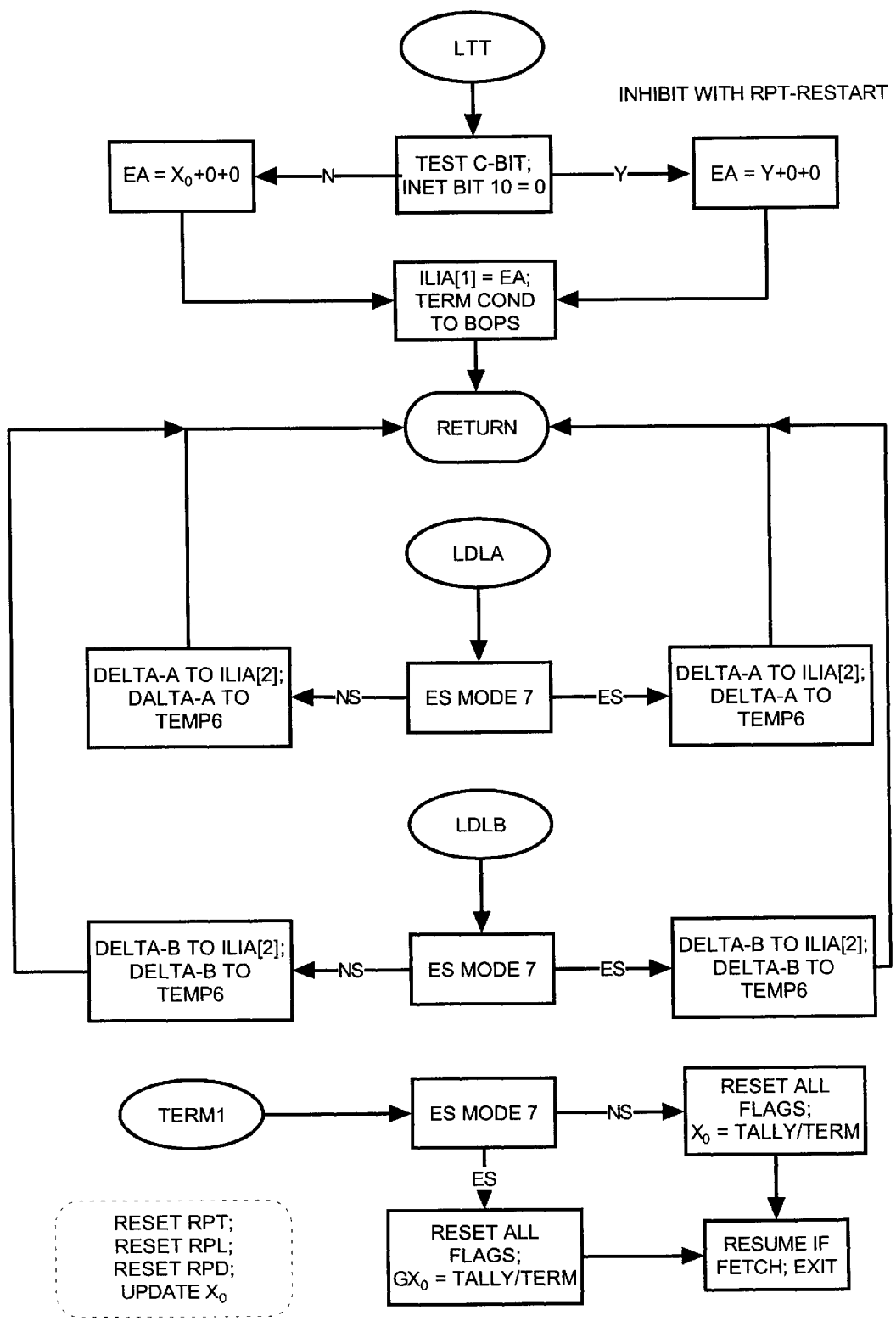
FIG. 11 is a process flow chart of operations common to restart of REPEATS iterative execution instructions.

REPEATS instruction, as the name suggest, repeat a specified instruction, and there are variants, in the exemplary environment, for a single repeat, a double repeat and a linked repeat. Detailed process flow charts for REPEATS operations are presented in: FIG. 9 (FIGS. 9A, 9B and 9C, taken together) for the repeat demand paging flow process; FIG. 10 (FIGS. 10A, 10B and 10C, taken together) for the repeat link paging flow process; and FIG. 11 which shows processes common to all the REPEATS.

The following Repeat Flags are used with Demand Paging and are saved in the safestore 40 word 02 (FIG. 5).

RPT-A—Set when Xn is updated with the initial EA for the repeated instruction. An RCLIMB to repeat instructions will use X0 and Xn to restart repeated instructions. This flag is saved in the safestore memory word 02 [7] during the FCLIMB.

RPT-B—Set when Xn is updated with the initial EA for the ODD instruction of a RPD. The RCLIMB to the RPD will use Xn to restart the ODD instruction. It is stored in safestore word 02 [8] during the FCLIMB.

RPT-FRST—Set when the fault occurs on the EVEN instruction of a RPD. The RCLIMB to the RPD will skip the even instruction if this flag is reset. It is stored in the safestore word 02 [9] during the FCLIMB.

RPT-RESTART—This is an NSA_FLAG in group 3, bit 3. It is set by firmware during an RCLIMB to enable RPT recovery of a page fault. It is reset by firmware during the FCLIMB in the case where the repeat recovery did not get far enough to enable recovery.

RPT-FLG1—Temporary flag used during RPD recovery to store safestore word 02 [8].

RPT-FLG2—Temporary flag used during RPD recovery to store safestore word 02 [9].

SET RPT-B PULSE—PULSE G10, Bit 0)—Provides a set pulse for RPT_B. It is used during a RPD recovery to set RPT-B when safestore word 02 [8] is set.

GCOND BRANCH (Decode=9)—The hardware equation is: XED-RESTART+XEC-RESTART+IND RESTART+ RPT-RESTART. This function is used during the fault processing to determine if restart information has already been saeved in safestore and can be used to test for RPT-RESTART during a RPT instruction.

RPD—Set by firmware when RPD is executed Tested during a fault to inhibit S the transfer of XED2 to safestore P&L 5. The RPD execution saves the RPD instruction in safestore P&L 5.

The foregoing description describes the invention in the environment of a multiprocessor computer system; however, it will be appreciated by those skilled in the art that the invention may be used with equal effect in a uniprocessor system which includes iterative execution instructions.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. In a fault tolerant central processing unit including a local cache memory, which central processing unit is a component of a computer system including memory external to the central processing unit, the central processor unit further including data manipulation circuitry having a plurality of software visible registers for temporarily storing data processing information and a safestore memory for storing the data processing information stored in the plurality of software visible registers, after a data manipulation operation, in order to facilitate restart after a detected fault by transferring the the data processing information stored in the safestore memory back to the software visible registers during recovery from the detected fault, a method for restarting iterative execution instructions after a page fault, indicating that a valid copy of a required memory page is not present in the local cache, has been taken, the method comprising:

A) during the execution of an iterative execution instruction, additionally storing in the safestore memory:
      1) status information indicative of:
         a) an ongoing status of the execution of the iterative execution instruction; and
         b) a point at which valid intermediate results were obtained during the execution of the iterative execution instruction;
      2) a plurality of flags including a flag indicating whether a page fault occurred during execution of an EXECUTE or EXECUTE DOUBLE itereative execution instruction;
   B) in the event of the occurrence of a page fault which includes detection of a missing page encountered during the execution of the iterative execution instruction, suspending execution of the iterative execution instruction until access to a valid copy of the missing page is obtained from memory external to the central processing unit; and
   C) when a valid copy of the missing page is obtained, restarting the execution of the iterative execution instruction at the point at which the valid intermediate results had been obtained prior to the page fault.

2. The method of claim 1 in which the plurality of flags stored in the safestore memory include a flag indicating whether a page fault occurred during execution of an EXECUTE DOUBLE itereative execution instruction which includes a first instruction component and a second instruction component.

3. The method of claim 1 in which the plurality of flags stored in the safestore memory include a flag indicating whether a page fault occurred during execution of an INDIRECT cycle sequence.

4. The method of claim 1 in which the plurality of flags stored in the safestore memory include a flag indicating whether a page fault occurred during execution of a REPEAT cycle sequence.

5. The method of claim 2 in which the plurality of flags stored in the safestore memory include a flag indicating whether a page fault occurred during execution of a first instruction component of an EXECUTE DOUBLE itereative execution instruction.

6. The method of claim 5 in which the plurality of flags stored in the safestore memory further include a flag indicating whether a page fault occurred during execution of the second instruction component of an EXECUTE DOUBLE sequence.

7. The method of claim 4 in which the plurality of flags stored in the safestore memory include RPT-A, RPT-B, RPT-FRST, RPT-RESTART, RPT-FLG1 and PRT-FLG2 flags.

* * * * *